(12) United States Patent
Malloch

(10) Patent No.: US 12,579,802 B1
(45) Date of Patent: Mar. 17, 2026

(54) VARIABLE COMPUTE IMAGE BACKBONES

(71) Applicant: GM Cruise Holdings LLC, San Francisco, CA (US)

(72) Inventor: Jeremy Malloch, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 310 days.

(21) Appl. No.: 18/401,966

(22) Filed: Jan. 2, 2024

(51) Int. Cl.
    *G06V 10/70*     (2022.01)
    *G06T 7/73*     (2017.01)
    *G06V 10/77*     (2022.01)
    *G06V 10/82*     (2022.01)

(52) U.S. Cl.
    CPC ............... *G06V 10/87* (2022.01); *G06T 7/74* (2017.01); *G06V 10/7715* (2022.01); *G06V 10/82* (2022.01); *G06T 2207/10016* (2013.01); *G06T 2207/20081* (2013.01);
(Continued)

(58) Field of Classification Search
    CPC .... G06V 10/87; G06V 10/7715; G06V 10/82; G06V 2201/03; G06T 7/74; G06T 2207/10016; G06T 2207/20081; G06T 2207/20084; G06T 2207/30252
    See application file for complete search history.

(56) References Cited

U.S. PATENT DOCUMENTS

| | | | |
|---|---|---|---|
| 6,516,099 B1 * | 2/2003 | Davison .................... | G06T 7/33 348/42 |
| 10,706,587 B1 * | 7/2020 | Sorgi ........................ | G06T 7/80 |
| 2019/0286921 A1 * | 9/2019 | Liang .................... | G06F 16/909 |

(Continued)

FOREIGN PATENT DOCUMENTS

| | | | | |
|---|---|---|---|---|
| CN | 114972425 A | * | 8/2022 | ............. G06V 20/58 |
| CN | 116630915 A | * | 8/2023 | ............. G06V 20/56 |

(Continued)

OTHER PUBLICATIONS

Jian Kuang et al. , "MIFI: Multi-Camera Feature Integration for Robust 3D Distracted Driver Activity Recognition," Aug. 22, 2023, IEEE Transactions on Intelligent Transportation Systems, vol. 25, No. 1, Jan. 2024, pp. 338-347.*

(Continued)

*Primary Examiner* — Omar S Ismail

(74) *Attorney, Agent, or Firm* — CANTOR COLBURN LLP

(57) ABSTRACT

Systems and methods for a multi-camera object detector having two or more backbone models. In particular, systems and methods are provided for including two or more backbone machine learning models, with one backbone optimized for speed and the other backbone optimized for precision. In particular, the first backbone can be highly accurate but slower than the second backbone and with a higher computer resource usage. The second backbone can be fast and efficient but have lower accuracy for object detection. In some examples, the second backbone can use fewer images and/or lower resolution images. The determination of which backbone to use can be based on fixed rules, or it can be determined based on another machine learning component. The outputs from the first and second backbones for each camera can be combined together into a unified representation, such as a bird's eye view (BEV) space.

20 Claims, 8 Drawing Sheets

(52) U.S. Cl.

CPC ............... *G06T 2207/20084* (2013.01); *G06T 2207/30252* (2013.01); *G06V 2201/03* (2022.01)

(56) References Cited

U.S. PATENT DOCUMENTS

| | | | | |
|---|---|---|---|---|
| 2021/0181351 A1* | 6/2021 | Ge | ........................... | G01S 17/89 |
| 2021/0271906 A1* | 9/2021 | Creusot | ................ | G06V 20/584 |
| 2022/0063569 A1* | 3/2022 | Herman | ................. | B60N 2/002 |
| 2023/0049561 A1* | 2/2023 | Sun | ........................ | G08G 1/168 |
| 2023/0098141 A1* | 3/2023 | Qi | .......................... | G06V 20/56 |
| | | | | 382/104 |
| 2023/0316742 A1* | 10/2023 | Li | .......................... | G06V 20/58 |
| | | | | 348/143 |
| 2024/0257531 A1* | 8/2024 | Khopkar | ................ | G06V 10/82 |

FOREIGN PATENT DOCUMENTS

| | | | | | |
|---|---|---|---|---|---|
| CN | 116934870 A | * | 10/2023 | ............... | G06T 7/80 |
| CN | 117036403 A | * | 11/2023 | ............... | G06T 7/251 |
| CN | 114511794 B | * | 9/2024 | ........... | G06F 18/253 |
| CN | 118780979 A | * | 10/2024 | ............. | G06V 10/82 |
| CN | 119863768 A | * | 4/2025 | ............... | G06N 5/04 |
| KR | 20240178962 A | * | 12/2024 | ........... | G06V 10/774 |
| KR | 20250089226 A | * | 6/2025 | ............... | G06T 3/18 |
| WO | WO-2022222095 A1 | * | 10/2022 | ............... | G06N 3/04 |
| WO | WO-2022242395 A1 | * | 11/2022 | ............... | G06T 3/40 |
| WO | WO-2023216654 A1 | * | 11/2023 | ........... | G06V 20/56 |
| WO | WO-2025035171 A1 | * | 2/2025 | ........... | G06V 20/588 |

OTHER PUBLICATIONS

Leyuan Liu et al., "A LiDAR-Camera Fusion 3D Object Detection Algorithm," Mar. 26, 2022, Information 2022, 13, 169, pp. 1-7.*

Yong Xu et al., "Multi-View 3D Shape Recognition via Correspondence-Aware Deep Learning," May 26, 2021, IEEE Transactions on Image Processing, vol. 30, 2021, pp. 5299-5310.*

Ying Li et al., "Deep Learning for LiDAR Point Clouds in Autonomous Driving: A Review," Aug. 21, 2020, IEEE Transactions on Neural Networks and Learning Systems, vol. 32, No. 8, Aug. 2021, pp. 3412-3426.*

Li-Hua Wen et al., "Fast and Accurate 3D Object Detection for Lidar-Camera-Based Autonomous Vehicles Using One Shared Voxel-Based Backbone," Jan. 29, 2021, IEEEAccess, vol. 9,2021, pp. 22080-22087.*

Xiucai Zhang et al., "Infrastructure 3D Target Detection Based on Multi-Mode Fusion for Intelligent and Connected Vehicles," Jul. 4, 2023, IEEEAccess, vol. 11, 2023, pp. 72803-72810.*

Guojun Wang et al., "Multi-View Adaptive Fusion Network for 3D Object Detection," Dec. 8, 2020, Computer Vision and Pattern Recognition, pp. 1-9.*

Sudeep Fadadu et al., "Multi-View Fusion of Sensor Data for Improved Perception and Prediction in Autonomous Driving," Jan. 2022, Proceedings of the IEEE/CVF Winter Conference on Applications of Computer Vision (WACV), 2022, pp. 2349-2355.*

Shangjie Li et al., "MVMM: Multiview Multimodal 3-D Object Detection for Autonomous Driving," Apr. 7, 2023, IEEE Transactions on Industrial Informatics, vol. 20, No. 1, Jan. 2024, pp. 845-851.*

Yingfei Liu et al., "PETR: Position Embedding Transformation for Multi-view 3D Object Detection," Oct. 30, 2022 , Computer Vision—ECCV 2022, Lecture Notes in Computer Science, vol. 13687, pp. 531-544.*

Ramin Nabati et al., "Radar-Camera Sensor Fusion for Joint Object Detection and Distance Estimation in Autonomous Vehicles," Sep. 17, 2020,arXiv:2009.08428v1, pp. 1-6.*

Ying Peng et al., "Survey on Image and Point-Cloud Fusion-Based Object Detection in Autonomous Vehicles," Sep. 23, 2022, IEEE Transactions on Intelligent Transportation Systems, vol. 23, No. 12, Dec. 2022, pp. 22772-22784.*

Lionel Heng et al., "Project AutoVision: Localization and 3D Scene Perception for an Autonomous Vehicle with a Multi-Camera System," Aug. 12, 2019, 2019 International Conference on Robotics and Automation (ICRA) Palais des congres de Montreal, Montreal, Canada, May 20-24, 2019, pp. 4695-4700.*

Liu et al., PETR: Position Embedding Transformation for Multi-View 3D Object Detection, arXIV:2203.05625v3 [cs.CV] Jul. 19, 2022, 18 pages.

* cited by examiner

SENSOR DATA
202

PERCEPTION, UNDERSTANDING,
AND TRACKING 204

PREDICTION 206

PLANNING 210

CONTROLS 212

280

230

200

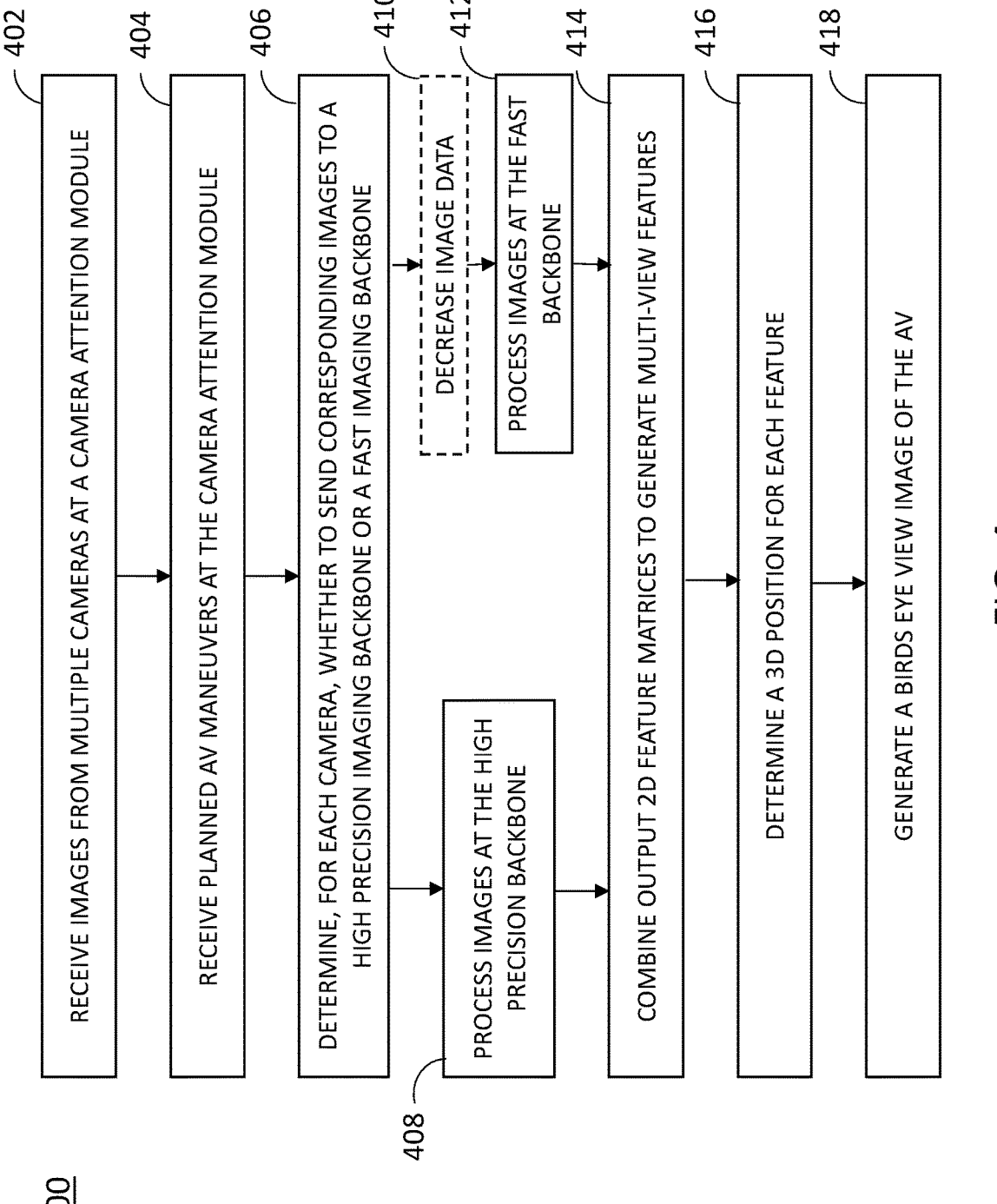

400

402 RECEIVE IMAGES FROM MULTIPLE CAMERAS AT A CAMERA ATTENTION MODULE

404 RECEIVE PLANNED AV MANEUVERS AT THE CAMERA ATTENTION MODULE

406 DETERMINE, FOR EACH CAMERA, WHETHER TO SEND CORRESPONDING IMAGES TO A HIGH PRECISION IMAGING BACKBONE OR A FAST IMAGING BACKBONE

408 PROCESS IMAGES AT THE HIGH PRECISION BACKBONE

410

412 DECREASE IMAGE DATA

414 PROCESS IMAGES AT THE FAST BACKBONE

COMBINE OUTPUT 2D FEATURE MATRICES TO GENERATE MULTI-VIEW FEATURES

416 DETERMINE A 3D POSITION FOR EACH FEATURE

418 GENERATE A BIRDS EYE VIEW IMAGE OF THE AV

FIG. 4

VARIABLE COMPUTE IMAGE BACKBONES

BACKGROUND

1. Technical Field

The present disclosure generally relates to vehicle imaging and, more specifically, to camera image encoders for autonomous vehicles.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, ultrasonic sensors, inertial sensor module (ISM), acoustic sensors, amongst others. The sensors perceive the environment around the vehicles and collect massive data and measurements that the autonomous vehicle can use for operations such as control and navigation. The sensors can provide the data and measurements to an internal computing system of the autonomous vehicle, which can use the data and measurements to predict, plan and control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 4 is a flow chart of an exemplary method for processing multi-camera input images, according to some examples of the present disclosure;

DETAILED DESCRIPTION

Figure 1A:
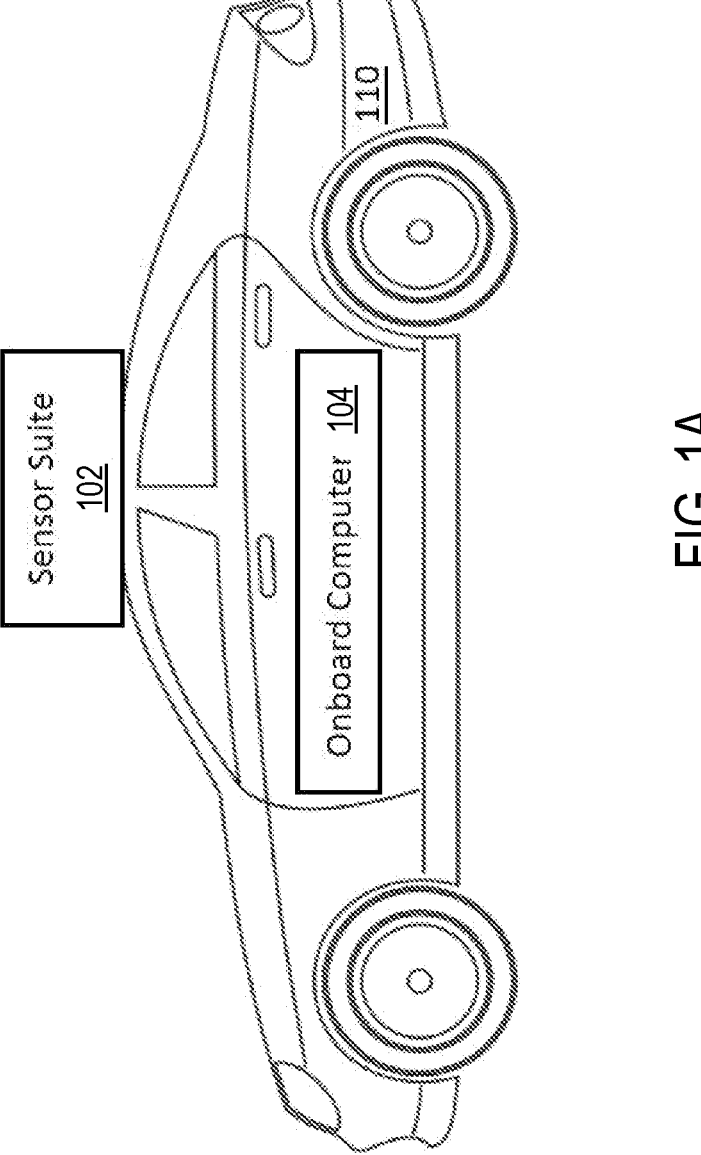
FIGS. 1A-1B illustrates an autonomous vehicle including variable compute image backbones, according to some examples of the present disclosure.

The detailed description set forth below is intended as a description of various configurations of the subject technol-ogy and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

AVs can provide many benefits. For instance, AVs may have the potential to transform urban living by offering an opportunity for efficient, accessible, and affordable transportation. AVs include multiple sensors and use sensor data to perceive AV surroundings, including both static and moving objects. AVs utilize perception and understanding of AV surroundings to plan a trajectory for the AV.

An AV can include many different types of sensors, including, for example, cameras, light detection and ranging (lidar) sensors, radio detection and ranging (radar) sensors, time-of-flight sensors, accelerometers, gyroscopes, inertial measurement units, and the like. However, processing all the sensor data for all of the sensors can be computationally expensive. In various examples, for multiple sensors and for multiple types of sensors, a vehicle can have data for a full 360 degrees field of view. The vehicle can have separate streams of data captured by different sensors having different fields of views. In some examples, the sensor data includes image data, and in various scenarios, high accuracy image data is only used from selected cameras and/or selected view points, while less relevant cameras and/or view points can provide lower quality image data. For example, when a vehicle is stopped and making a right hand turn, high accuracy image data from the front left and front right of the AV may be used for object detection and determining when to initiate the right turn maneuver, while high accuracy image data from behind the AV may not be utilized.

Systems and methods are provided for a multi-camera object detector having two or more backbone models. In particular, systems and methods are provided for including two or more backbone machine learning models, with one backbone optimized for speed and the other backbone optimized for precision. In particular, the first backbone can be highly accurate but slower than the second backbone and with a higher computer resource usage. The second backbone can be faster and more efficient but have lower accuracy for object detection. In some examples, the second backbone can use fewer images and/or lower resolution images. In some examples, the second backbone is a less computationally expensive model, and uses fewer FLOPs for the same input. The determination of which backbone to use can be based on fixed rules, or it can be determined based on another machine learning component. The outputs from the first and second backbones for each camera can be combined together into a unified representation, such as a bird's eye view (BEV) space or some other similar space.

In general, autonomous vehicles have a limited amount of computational power and resources. In some examples, the computer vision stack of an autonomous vehicle can use more than half of the computational power of the vehicle. Thus, decreasing the amount of processing at the computer vision stack can result in significant saving of resources such as computational power. For example, the vehicle may consume less power from doing fewer computations. In some examples, the vehicle cost can be lowered since less hardware is provisioned. To save resources and increase vehicle efficiency, a subset of the vehicle cameras can be turned off during certain situations to save computational resources. However, this can result in a blind spot in a selected area. Thus, systems and methods are described herein for downscaling the computational resources dedicated to selected cameras in various situations to save on compute resources while continuing imaging of the vehicle surroundings and preventing blind spots.

Example Vehicle for Variable Compute Image Backbones

FIG. 1A illustrates an autonomous vehicle 110 including variable compute image backbones, according to some examples of the present disclosure. The autonomous vehicle 110 includes a sensor suite 102 and an onboard computer 104. The sensor suite 102 can include multiple cameras, and the onboard computer 104 can include multiple compute image backbones as described herein. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. In some examples, the autonomous vehicle 110 is a personal autonomous vehicle that is used by one or more owners for driving to selected destinations. In some examples, the autonomous vehicle 110 can connect with a central computer to download vehicle updates, maps, and other vehicle data.

The sensor suite 102 includes localization and driving sensors. For example, the sensor suite 102 may include one or more of photodetectors, cameras, RADAR, sound navigation and ranging (SONAR), LIDAR, Global Positioning System (GPS), inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment. In particular, the sensor suite 102 can be used to identify information and determine various factors regarding an autonomous vehicle's environment. In some examples, data from the sensor suite 102 can be used to update a map with information used to develop layers with waypoints identifying various detected items, such as locations of roadside shelters. Additionally, sensor suite 102 data can provide localized traffic information, ongoing road work information, and current road condition information. Furthermore, sensor suite 102 data can provide current environmental information, including current roadside environment information, such as the presence of people, crowds, and/or objects on a roadside or sidewalk. In this way, sensor suite 102 data from many autonomous vehicles can continually provide feedback to a mapping system and a high fidelity map can be updated as more and more information is gathered.

In various examples, the sensor suite 102 includes cameras implemented using high-resolution imagers with fixed mounting and field of view. Each camera can be coupled to a high accuracy compute imaging backbone and a high speed compute imaging backbone, and an imaging module can determine which imaging backbone is used for each camera in various situations and at any selected time. The imaging module can be part of the onboard computer 104 or the imaging module can be coupled to the onboard computer 104. In further examples, the sensor suite 102 includes LIDARs implemented using scanning LIDARs. Scanning LIDARs have a dynamically configurable field of view that provides a point cloud of the region intended to scan. In still further examples, the sensor suite 102 includes RADARs implemented using scanning RADARs with a dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine the state of the autonomous vehicle 110. In some examples, the onboard computer 104 checks for vehicle updates from a central computer or other secure access points. In some examples, the onboard computer 104 performs real time diagnostics of circuit boards in the vehicle. In some examples, the onboard computer 104 performs real time diagnostics of signal transmissions in the vehicle. In some examples, a vehicle sensor log receives and stores processed sensed sensor suite 102 data from the onboard computer 104. In some examples, a vehicle sensor log receives sensor suite 102 data from the sensor suite 102. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passengers inside the vehicle. Additionally, based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine the states of the autonomous vehicle. In some implementations, the onboard computer 104 is a general purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles. In some examples, the onboard computer 104 is coupled to the imaging backbones described herein. In some examples, the imaging backbones are components of the onboard computer 104.

According to various implementations, the autonomous driving system 100 of FIG. 1A functions to enable an autonomous vehicle 110 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, a bicycle, a scooter, a tractor, a lawn mower, a commercial vehicle, an airport vehicle, or a utility vehicle. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle. In general. Various embodiments herein and their advantages may apply to a wide range of vehicles (e.g., semi-autonomous vehicles, vehicles with driver-assist functionalities, etc.), and not just AVs.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Figure 1B:
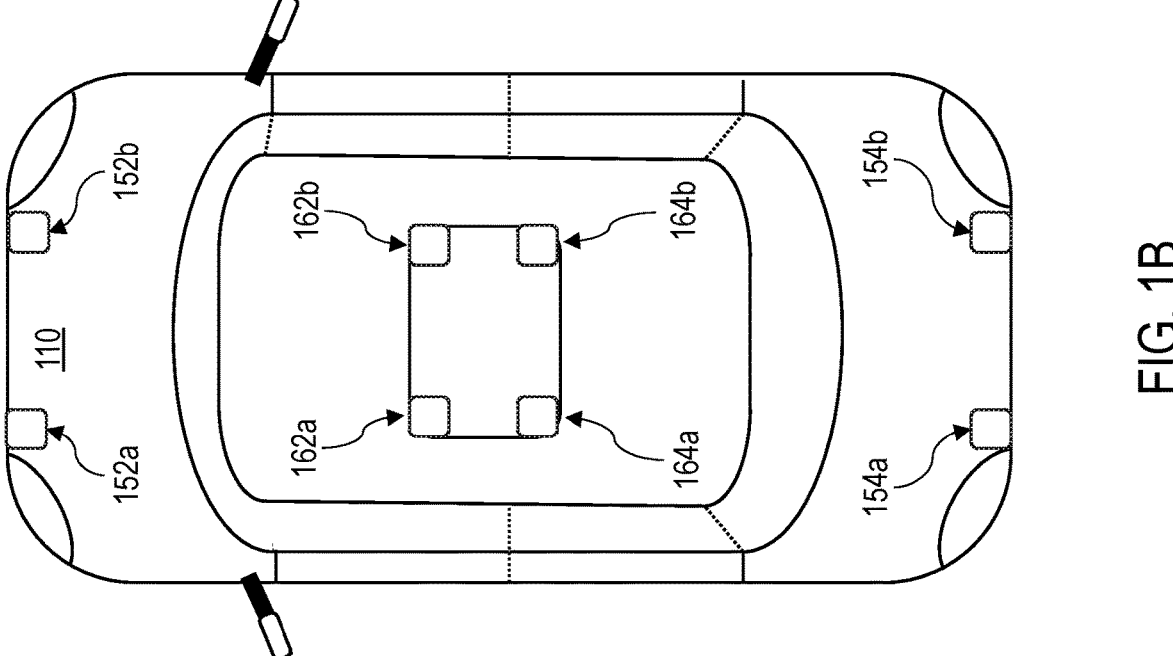

FIG. 1B illustrates a top view of the autonomous vehicle 110, including cameras 152a, 152b, 154a, 154b, 162a, 162b, 164a, 164b. In various examples, the autonomous vehicle 110 can include more cameras or fewer cameras. In some examples, one or more of the cameras 152a, 152b, 154a, 154b, 162a, 162b, 164a, 164b can be located in a different position on the autonomous vehicle 110. Each of the cameras can be coupled to two or more compute imaging backbones as described herein.

Exemplary AV Stack that Controls the AV

Figure 2:
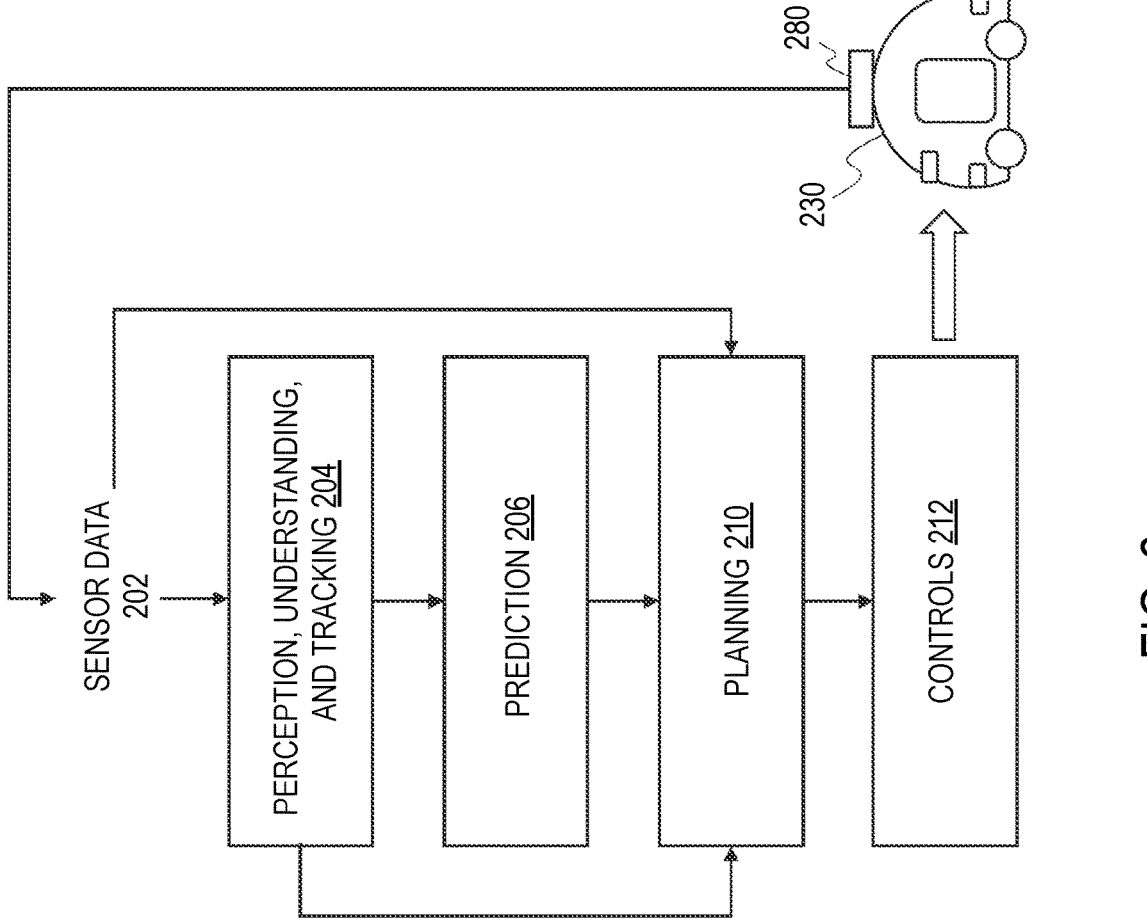
FIG. 2 illustrates an exemplary AV stack and an AV 230, according to some aspects of the disclosed technology.

FIG. 2 illustrates an exemplary AV stack and an AV 230, according to some aspects of the disclosed technology. An AV 230 may be equipped with a sensor suite 280 to sense the environment surrounding the AV and collect information (e.g., sensor data 202) to assist the AV in making driving decisions as described above with respect to FIG. 1A. The sensor suite 280 may include, e.g., sensor systems 604, 606, and 608 of FIG. 6. The AV stack may include perception, understanding, and tracking part 204, prediction part 206, planning part 210, and controls part 212. The sensor data 202 may be processed and analyzed by perception, understanding, and tracking part 204 to identify and track objects in the environment of the AV and determine a perception and understanding of the environment of the AV 230. In some examples, the perception, understanding, and tracking part 204 includes the backbones described herein. Prediction part 206 may determine future motions and behaviors of the AV and/or tracked objects in the environment of the AV 230. The AV 230 may localize itself based on location information (e.g., from location sensors) and the map information. The planning part 210 may create planned paths or trajectories based on one or more of: information from perception, understanding, and tracking part 204, information from prediction part 206, the sensor data 202, map information, localization information, etc. Subsequently, planned paths or trajectories can be provided to controls part 212 to generate vehicle control commands to control the AV 230 (e.g., for steering, accelerating, decelerating, braking, turning on vehicle signal lights, etc.) according to the planned path.

The operations of components of the AV stack may be implemented using a combination of hardware and software components. For instance, an AV stack performing the perception, understanding, prediction, planning, and control functionalities may be implemented as software code or firmware code encoded in non-transitory computer-readable medium. The code for AV stack may be executed on one or more processor(s) (e.g., general processors, central processors (CPUs), graphical processors (GPUs), digital signal processors (DSPs), ASIC, etc.) and/or any other hardware processing components on the AV. Additionally, the AV stack may communicate with various hardware components (e.g., on-board sensors and control system of the AV) and/or with an AV infrastructure over a network. At least a part of the AV stack may be implemented on local computing device 610 of FIG. 6. At least a part of the AV stack may be implemented on the computing system 700 of FIG. 7 and/or encoded in instructions of storage device 730 of FIG. 7.

Example Diagram of Variable Compute Image Backbones

Figure 3:
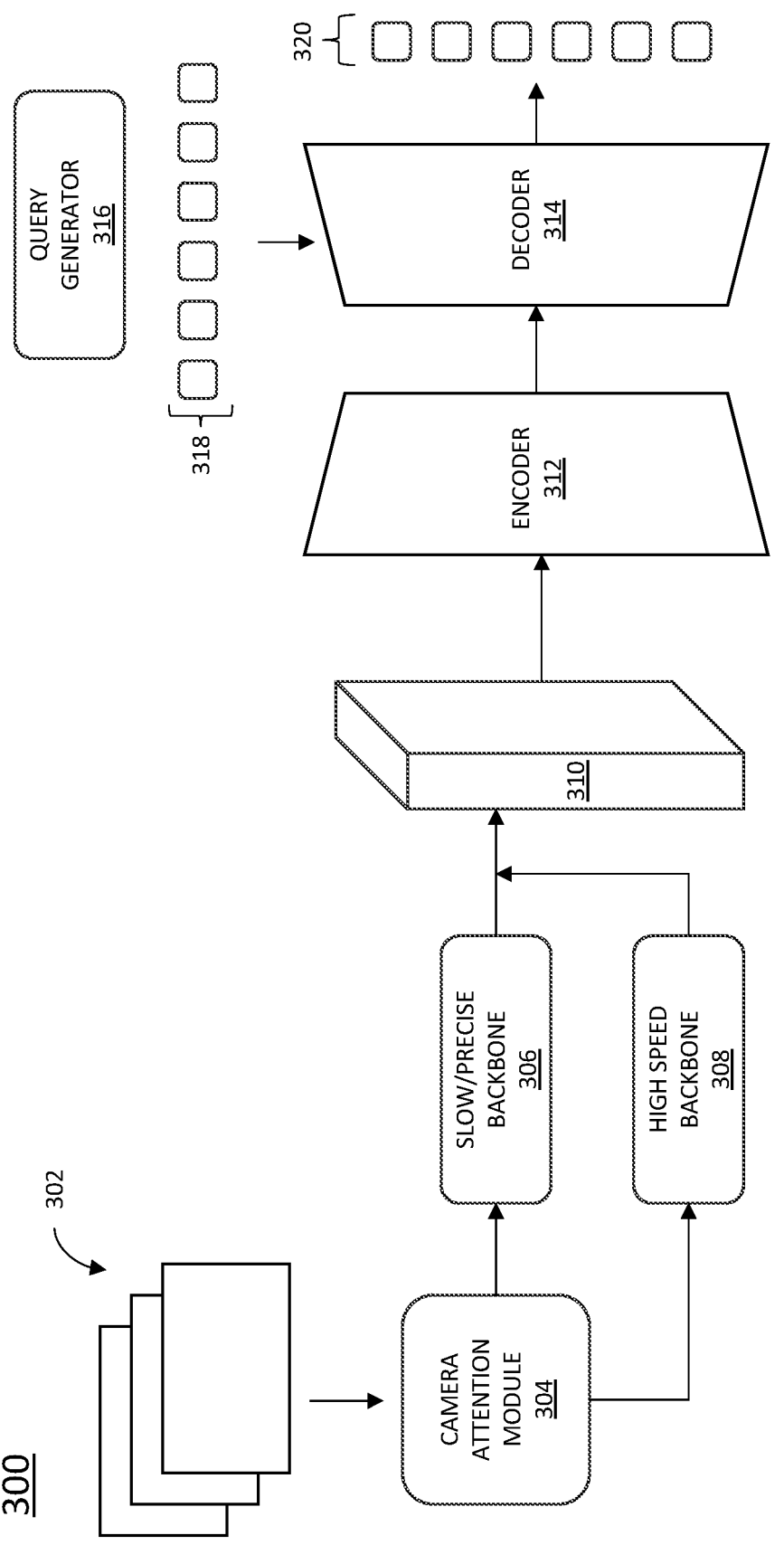
FIG. 3 illustrates an example diagram of an image processor including two imaging backbones, according to some examples of the present disclosure.

FIG. 3 illustrates an example diagram of an image processor 300 including two imaging backbones 306, 308, according to some examples of the present disclosure. In various examples, the image processor 300 can receive as input images from multiple cameras representing views around an AV and generate as output a birds eye view (BEV) perspective image of the views from above the AV. In particular, images 302 from multiple cameras are input to a camera attention module 304, which determines whether the images are to be processed in a first high precision backbone 306, or whether the images are to be processed in a second high speed backbone 308. In some examples, the camera attention module 304 can determine which backbone 306, 308 to use for each camera based on a set of rules input to the camera attention module 304. In some examples, the camera attention module 304 includes a machine learning model which learns when to select which backbone 306, 308. In some examples, the system includes more than two backbones, and the camera attention module 304 selects the backbone for processing based on fixed rules and/or learned criteria.

In various examples, the camera attention module 304 outputs high resolution image data to the first backbone 306 for high precision image processing, including feature identification and object detection. Thus, the first backbone 306 receives high resolution image input, and generates long range and highly reliable object detection data. However, the first backbone can be computationally intensive and it can be slower than the second backbone 308.

In some examples, when the second backbone 308 is selected, the camera attention module 304 decreases the input image resolution, either by decreasing the number of image frames input to the second backbone 308, or decreasing the resolution of each of the image frames before inputting the image frames to the second backbone 308. Thus, in some examples, the second backbone 308 receives lower resolution image input and it is optimized for speed. In some examples, decreasing the number of image frames input to the second backbone 308 includes re-using the features processed from the previous time input. In some examples, the second backbone 308 runs at a slower rate than the first backbone. For instance, the second backbone 308 may run at 5 Hz while the first backbone runs at 10 Hz. In various examples, when the second backbone 308 runs at half the speed of the first backbone, for every other frame, the incoming image is discarded and the previous output is used. The previous output can be an output from 100 ms earlier. The second backbone can also perform feature detection and it may reliably detect objects at close range, but the second backbone 308 may be less accurate in detecting objects at a longer distance from the vehicle due to the lower resolution input image data.

In some examples, the camera attention module 304 does not change the image resolution, and instead the second backbone 308 uses a different kernel size than the first backbone 306 making it more efficient but less accurate. For instance, the second backbone 308 can use 3×3 kernels, factorized convolutions (e.g., 3×1 followed by 1×3 convolutions), or pointwise and depthwise convolutions (1×1 followed by a depthwise convolution), while the first backbone uses larger kernels, such as 7×7 kernels. In some examples, the second backbone 308 is a neural network model having fewer layers than the first backbone 306. For instance, the second backbone can be a deep residual network (ResNet) having eighteen layers while the first backbone can be a ResNet having fifty layers (or a larger vision transformer model). In some examples, the second backbone 308 is less computationally expensive and uses fewer FLOPs (floating point operations per second) for the input. In some examples, the second backbone 308 can be quantized and use a lower precision datatype (INT4, INT8, FP16) as compared to the first backbone 306 which uses a higher precision datatype (INT 8, FP16, FP32). In some examples, the second backbone 308 can use hardware accelerated sparsity (e.g., structured sparsity, and/or 2:4 sparsity on a GPU).

In general, there are several ways to make the second backbone a faster, less precise, model. In some examples, the software for the second backbone can be altered. Potential software changes can include fewer parameters, fewer floating point operations, fewer model layers, a smaller kernel size, and fewer channels. In some examples, the hardware for the second backbone can be different. For example, the lower precision data types can be used in the quantization of the faster backbone (e.g., INT4, INT8, FP8, FP16). In another example, sparsity patterns can be used, such as 2:4 sparsity, that are accelerated on some hardware. If the hardware used to run inference is non-homogenous, less powerful subcomponents can be used to run the lighter backbone. For example, for some backend components, smaller multiple instance GPU partitions can be used for the smaller backbone. Similarly, a CPU can be used for the lighter backbone in place of a powerful accelerator for the more precise and computationally intensive backbone.

Examples of fixed rules that can be used by the camera attention module 304 to determine which backbone 306, 308 to send the input images 302 to, include rules regarding vehicle behavior. For example, when a vehicle is making a right turn from a minor (small) road to a major (main) road, the left facing camera images can be input to the high precision backbone 306 for high resolution processing and high performance detection of any objects (e.g., vehicles) incoming from the left side, while the front right facing camera images can be input to the high speed backbone 308 for lower resolution image processing and focusing on close range objects such as pedestrians (since no oncoming traffic is expected from the right in this scenario). In some examples, when an AV is making a right turn onto a high speed (e.g., 45 mph) road, the vehicle detects oncoming cars and traffic from a long distance and decides if the AV will have enough time clearance to merge onto the major road and accelerate up to speed. As the AV begins to make the turn onto the major road and angles itself towards its future direction of travel, the left and near left camera images can be input to the high precision backbone 306.

When the vehicle is making a right turn, images from the rear-facing cameras may be input to the high speed backbone 308, since vehicle maneuvering does not depend on traffic from behind the vehicle. In another example, when a vehicle is making a left turn, images from cameras directed in front of the vehicle may be input to the high precision backbone 306 for high resolution processing and high performance detection of any objects coming toward the vehicle or toward the vehicles anticipated path, while images from rear vehicle cameras may be input to the high speed backbone 308 for lower resolution image processing. For instance, when a vehicle is making an unprotected left turn at an intersection, the vehicle uses image data to determine when the vehicle has enough clearance room before oncoming traffic. In various examples, objects detected behind the vehicle are less likely to affect the vehicle's driving path. In another example, when a vehicle is reversing into a parking spot, the forward facing camera images may be input to the high speed backbone 308 for lower resolution image processing and focus on close range objects, while the rear-facing camera images can be input to the high precision backbone 306 for high resolution processing and high performance detection of any objects behind the vehicle that may be in the vehicle's predicted path.

In another example, when a vehicle is driving on a highway, the front and rear cameras may use the first backbone 306 in order to see conditions ahead and scan for speeding vehicles from behind, including emergency vehicles that are trying to overtake and pass the vehicle. However, the side cameras may use the second backbone 308 since there is unlikely to be significant lateral traffic on the highway.

In other examples, the camera attention module 304 can use an adaptive model for learning when to use various vehicle cameras. In some examples, an attention score can be assigned to each camera, and the assigned backbone can depend on the attention score. In some examples, the camera attention module 304 includes a machine learning model for assigning the attention score to each camera depending on the next vehicle maneuver. In various examples, the camera attention module 304, and the backbones 306, 308 each include a machine learning model, such as a neural network. Neural networks are discussed in greater detail with respect to FIG. 6.

Another example of an adaptive model for the camera attention module 304 to learn when to use images from each camera includes a temporal aggregation model in which heuristic rules such as those discussed above are mixed with features from previous camera timestamps. In some examples, for long tail events, the model can learn to pay extra attention to images from selected cameras when a typical pattern is not followed. In some examples, routing algorithms can be used in the model and in determining which sets of images to evaluate in high resolution versus which sets of images to evaluate in lower resolution, and thus, for each camera, which backbone 306, 308 to send images to.

In various examples, the images from a first camera are input to the first backbone 306, and the first backbone 306 extracts two-dimensional (2D) features. In various examples, the features are represented by a depth×$H_F$×$W_F$ matrix. Similarly, the images from a second camera are input to the second backbone 308, and the second backbone 308 extracts two-dimensional (2D) features. In various examples, the features are represented by a ($H_F$×$W_F$) matrix. The first backbone 306 outputs a high precision feature matrix and can be significantly more computationally intensive and use significantly more computer power than the second backbone 308. The second backbone 308 can be faster and more efficient, using fewer resources, and outputting a lower precision feature matrix.

In various examples, the features extracted from the first backbone 306 (from images from a first camera) are combined with the features extracted from the second backbone 308 (from images from a second camera) to generate the 2D multi-view features 310, which can include features from N cameras by including N ($H_F$×$W_F$) matrices. In some examples, the features extracted from the first backbone 306 are concatenated with the features extracted from the second backbone 308. In various examples, there is one feature matrix for each camera (one matrix for each of N views), and the feature matrices for each camera are combined to generate the multi-view features 310. The feature matrix generated for each camera can be generated either by a high precision backbone model, such as the first backbone 306 or by a high speed backbone model, such as the second backbone 308.

The features 310 are input to an encoder 312, which can determine a three-dimensional (3D) position for each feature and generate 3D position-aware features $F^{3d}$. In some examples, the encoder 312 receives the 2D features 310 and 3D coordinates $P^{3D}$. The encoder 312 can include a multi-layer perception network that transforms the 3D coordinates to 3D position embedded data. Additionally, the encoder 312 can transform the features 310 by a 1×1 convolution layer and add the 3D position embedded data to the transformed features to generate the 3D position-aware features $F^{3d}$.

The 3D position-aware features $F^{3d}$ are input to a decoder 314, which can be a transformer decoder. The decoder 314 can flatten the 3D position-aware features $F^{3d}$. The decoder 314 also receives object queries 318 from the query generator 316. The object queries 318 are updated by the decoder 314 through interaction with the 3D position-aware features to generate updated queries 320 which can be used to predict 3D bounding boxes for detected objects and object classes for the detected objects. In various examples, the decoder 314 outputs a birds eye view image of the AV.

In some examples, the output from the first backbone 306 is combined with the output from the second backbone 308 in birds eye view images and using a convolution layer. In other examples, a different method can be used to convert the images to birds eye view. In some examples, an end-to-end machine learning model can be used to determine conversion methods and determine driving plans.

Method for Variable Compute Image Backbones

FIG. 4 is a flow chart of an exemplary method 400 for processing multi-camera input images, according to some examples of the disclosure. At step 402, images from multiple cameras are received at a camera attention module, such as the camera attention module 304 described above with respect to FIG. 3. At step 404, the planned AV maneuvers are received at the camera attention module 304. The planned maneuvers can include driving maneuvers, and in some examples, the driving maneuvers can be from a list of potential driving maneuvers. In some examples, the driving maneuvers can include driving forward, driving in reverse, and turning maneuvers. In some examples, the driving maneuvers can be driving maneuvers that are planned to occur within the next few seconds, and/or within the next minute. In some examples, the driving maneuvers can include maneuvers currently being implemented by the AV. In various examples, step 404 can occur before step 402, and/or steps 402 and 404 can occur simultaneously.

At step 406, for each camera, the camera attention module determines whether to send corresponding images to a high precision imaging backbone, such as the first backbone 306 described above with respect to FIG. 3, or a less accurate high speed imaging backbone, such as the second backbone 308 described above with respect to FIG. 3. The imaging backbones can be neural network models for image processing and feature detection. When the camera attention module determines that images from a selected camera are to be input to the high precision backbone, the method 400 proceeds to step 408, and the corresponding images are processed at the high precision backbone to generate a corresponding 2D feature matrix.

In some examples, when the camera attention module determines that images from a selected camera are to be input to the less accurate high speed imaging backbone, the method 400 proceeds to step 410 and the corresponding image data from the selected camera is decreased. In particular, in some examples, at step 410, the camera attention module can decrease the number of images for inputting to the fast backbone, such as by inputting every other image to the fast backbone thereby removing half of the images before processing. In similar examples, the camera attention module can decrease the number of images for inputting to the fast backbone, such as by inputting every third image to the fast backbone, inputting every fifth image to the fast backbone, or inputting every $10^{th}$ image to the fast backbone. In some examples, at step 410, the camera attention module can decrease the resolution of each image, thereby reducing image data size before processing. In some examples, the image processing system includes a separate component for decreasing image data before inputting the image data to the fast backbone for processing. After the image data is reduced at step 410, the method 400 proceeds to step 412 and the reduced image data from step 410 is input to the fast backbone. At step 412, the reduced image data for a selected camera is processed at the fast backbone to generate a corresponding 2D feature matrix for the respective camera.

In some implementations, the image processing system can include more than two backbones. For example, the image processing system can include the high precision backbone and the fast backbone, as well as a medium-precision medium-speed backbone. Any number of different backbones can be included to optimize for speed, efficiency, and accuracy.

At step 414, the 2D feature matrices from the high precision backbone are combined with the 2D feature matrices from the fast backbone to generate multi-view features. In various examples, there can be multiple 2D feature matrices (from multiple cameras) from the high precision backbone, and there can also be multiple 2D feature matrices (from multiple cameras) from the fast backbone. In some examples, there can be additional backbones. In one example, there are two backbones for each camera—one high precision backbone and one high speed backbone. In some examples, there is a camera attention module for each camera as well as two or more backbones for each camera, and the respective camera attention module for each camera determines which imaging backbone to send the corresponding camera images to. Thus, in some examples, camera data for each camera in a multi-camera system is processed simultaneously in multiple imaging backbones. The 2D feature matrix data for each camera of a multi-camera system (e.g., from multiple backbones) is combined at step 414 to generate a 2D multi-view feature matrix. In some examples, a $(H_F \times W_F)$ 2D feature matrix is generated for each camera, and at step 414, if there are N cameras in the multi-camera system, N $(H_F \times W_F)$ matrices are combined to generate the multi-view feature output. In some examples, one or more cameras can be turned off or otherwise not generate data, and there can be fewer than N $(H_F \times W_F)$ matrices combined at step 414.

At step 416, a 3D position is determined for each feature and 3D position-aware features $F^{3d}$ are generated. In some examples, the 3D position-aware features $F^{3d}$ are generated based on the 2D features from step 414 as well as a set of 3D coordinates. A multi-layer perception network can transform the 3D coordinates to 3D position embedded data. Additionally, the features 310 can be transformed by a 1×1 convolution layer and the 3D position embedded data can be added to the transformed features to generate the 3D position-aware features $F^{3d}$.

At step 418, a birds eye view image of the multi-camera image data is generated. In particular, the birds eye view image is based on the 3D position-aware features $F^{3d}$. In some examples, the 3D position-aware features $F^{3d}$ can be input to a decoder 314, which can be a transformer decoder, and the 3D position-aware features $F^{3d}$ can be flattened to generate the birds eye view image. In some examples, objects in the images can be detected based on the 3D position-aware features $F^{3d}$ and object queries. A decoder can predict 3D bounding boxes for detected objects, and the decoder can determine object classes for the detected objects.

Example Neural Network

Figure 5:
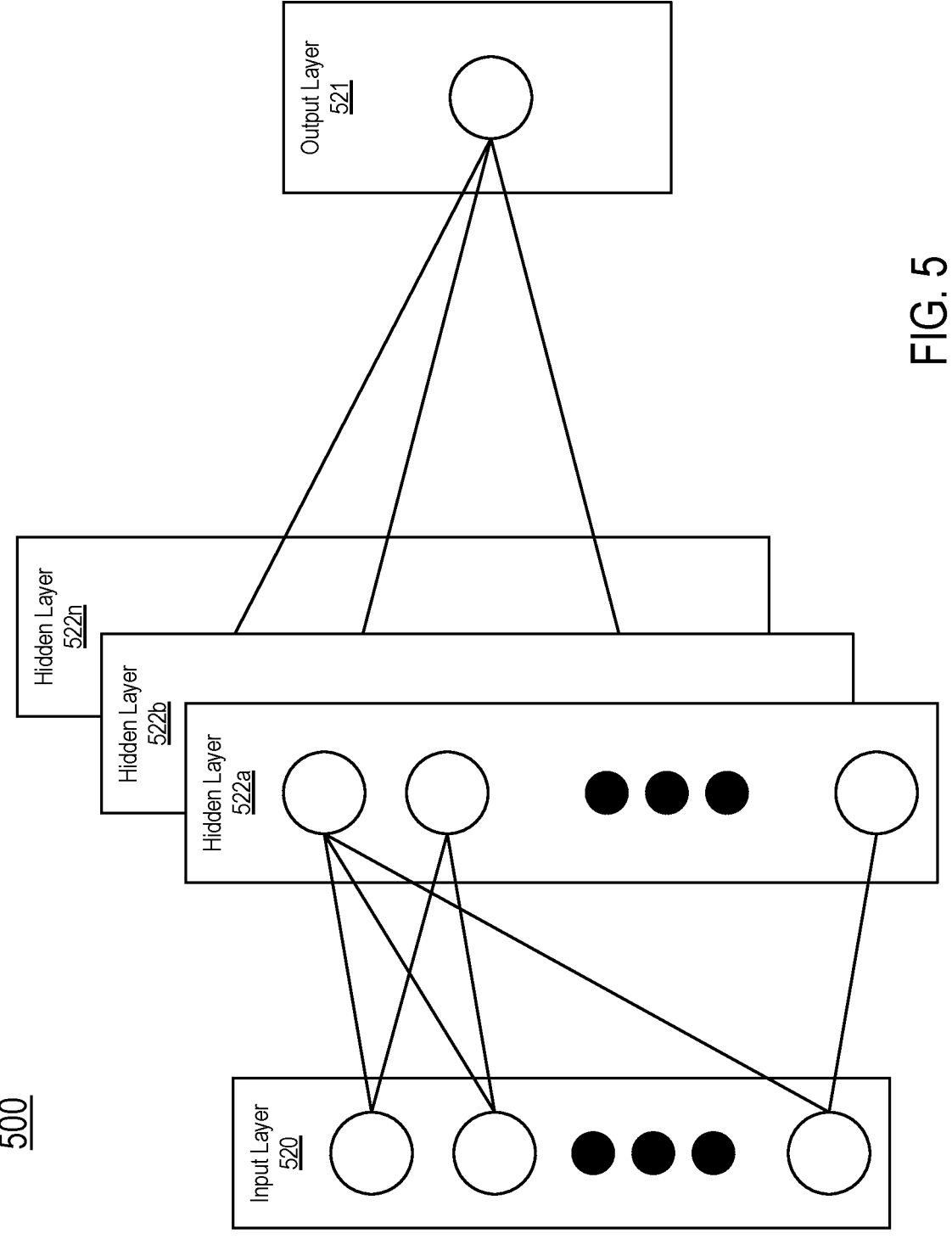
FIG. 5 illustrates an example of a deep learning neural network that can be used to implement a perception module and/or one or more validation modules, according to some aspects of the disclosed technology.

In FIG. 5, the disclosure now turns to a further discussion of models that can be used through the environments and techniques described herein. Specifically, FIG. 5 is an illustrative example of a deep learning neural network 500 that can be used to implement all or a portion of a camera attention module and/or an imaging backbone as discussed above. Additionally, the deep learning neural network 500 can be used to implement one or more of the perception, understanding, and tracking part 204, prediction part 206, planning part 210, and controls part 212 described above. An input layer 520 can be configured to receive sensor data and/or data relating to an environment surrounding an autonomous vehicle, as well as data on a next planned AV maneuver. The sensor data can include imaging data from various AV cameras. The neural network 500 includes multiple hidden layers 522a, 522b, through 522n. The hidden layers 522a, 522b, through 522n include "n" number of hidden layers, where "n" is an integer greater than or equal to one. The number of hidden layers can be made to include as many layers as needed for the given application. The neural network 500 further includes an output layer 521 that provides an output resulting from the processing performed by the hidden layers 522a, 522b, through 522n. In one illustrative example, for a camera attention module, the output layer 521 can determine which backbone the input data is transmitted to. In another illustrative example, for an imaging backbone, the neural network 500 can perform feature detection and the output layer 521 can provide a matrix of 2D multi-view features.

The neural network 500 is a multi-layer neural network of interconnected nodes. Each node can represent a piece of information. Information associated with the nodes is shared among the different layers and each layer retains information as information is processed. In some cases, the neural network 500 can include a feed-forward network, in which case there are no feedback connections where outputs of the network are fed back into itself. In some cases, the neural network 500 can include a recurrent neural network, which can have loops that allow information to be carried across nodes while reading in input.

Information can be exchanged between nodes through node-to-node interconnections between the various layers. Nodes of the input layer 520 can activate a set of nodes in the first hidden layer 522a. For example, as shown, each of the input nodes of the input layer 520 is connected to each of the nodes of the first hidden layer 522a. The nodes of the first hidden layer 522a can transform the information of each input node by applying activation functions to the input node information. The information derived from the transformation can then be passed to and can activate the nodes of the next hidden layer 522b, which can perform their own designated functions. Example functions include convolutional, up-sampling, data transformation, and/or any other suitable functions. The output of the hidden layer 522b can then activate nodes of the next hidden layer, and so on. The output of the last hidden layer 522n can activate one or more nodes of the output layer 521, at which an output is provided. In some cases, while nodes in the neural network 500 are shown as having multiple output lines, a node can have a single output and all lines shown as being output from a node represent the same output value.

In some cases, each node or interconnection between nodes can have a weight that is a set of parameters derived from the training of the neural network 500. Once the neural network 500 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 500 to be adaptive to inputs and able to learn as more and more data is processed.

The neural network 500 is pre-trained to process the features from the data in the input layer 520 using the different hidden layers 522a, 522b, through 522n in order to provide the output through the output layer 521.

In some cases, the neural network 500 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 500 is trained well enough so that the weights of the layers are accurately tuned.

To perform training, a loss function can be used to analyze errors in the output. Any suitable loss function definition can be used, such as a Cross-Entropy loss. Another example of a loss function includes the mean squared error (MSE), defined as $$E\_total = \sum \left( \frac{1}{2}(\text{target} - \text{output})^2 \right).$$

The loss can be set to be equal to the value of E_total.

The loss (or error) will be high for the initial training data since the actual values will be much different than the predicted output. The goal of training is to minimize the amount of loss so that the predicted output is the same as the training output. The neural network 500 can perform a backward pass by determining which inputs (weights) most contributed to the loss of the network, and can adjust the weights so that the loss decreases and is eventually minimized.

The neural network 500 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 500 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Example Autonomous Vehicle (AV) Management System

Figure 6:
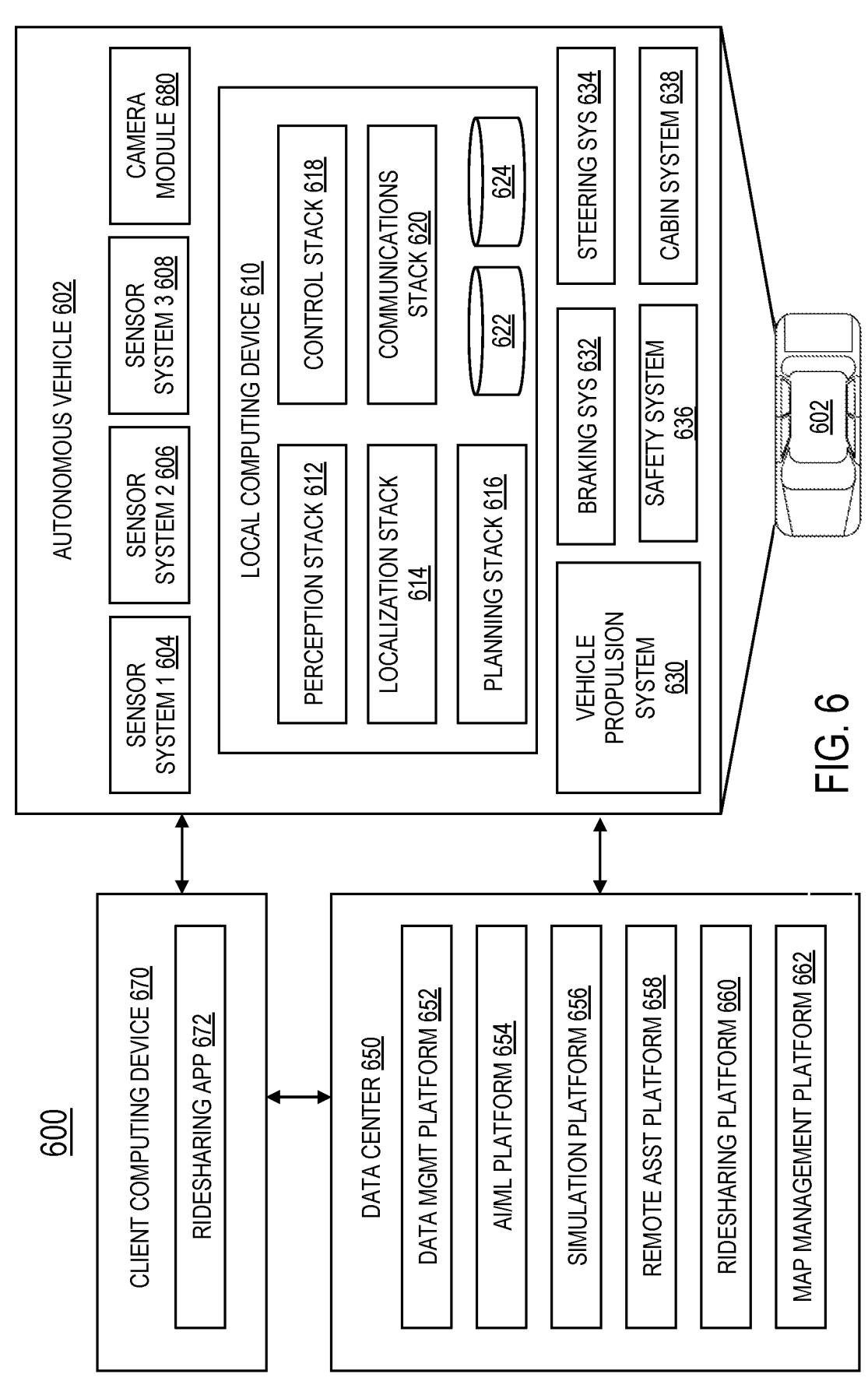
FIG. 6 illustrates an example system environment that can be used to facilitate autonomous vehicle (AV) dispatch and operations, according to some aspects of the disclosed technology.

Turning now to FIG. 6, this figure illustrates an example of an AV management system 600. One of ordinary skill in the art will understand that, for the AV management system 600 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 600 includes an AV 602, a data center 650, and a client computing device 670. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 602 can navigate about roadways without a human driver based on sensor signals generated by multiple sensor systems 604, 606, and 608. The sensor systems 604-608 can include different types of sensors and can be arranged about the AV 602. For instance, the sensor systems 604-608 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LIDAR system, and the sensor system 608 can be a RADAR system. Other embodiments may include any other number and type of sensors. Additionally, in various implementations, as discussed herein, a camera module 680 can be used for multi-camera image processing. The camera module can include a camera attention module as described herein, which can identify which backbone model to input a camera's images to. The camera module 680 can also include two or more backbone models for image processing as described herein. A camera module 680 can also be added to components of the AV 602 to for more efficient multi-camera object detection and to generate birds eye view images.

AV 602 can also include several mechanical systems that can be used to maneuver or operate AV 602. For instance, the mechanical systems can include vehicle propulsion system 630, braking system 632, steering system 634, safety system 636, and cabin system 638, among other systems. Vehicle propulsion system 630 can include an electric motor, an internal combustion engine, or both. The braking system 632 can include an engine brake, a wheel braking system (e.g., a disc braking system that utilizes brake pads), hydraulics, actuators, and/or any other suitable componentry configured to assist in decelerating AV 602. The steering system 634 can include suitable componentry configured to control the direction of movement of the AV 602 during navigation. Safety system 636 can include lights and signal indicators, a parking brake, airbags, and so forth. The cabin system 638 can include cabin temperature control systems, in-cabin entertainment systems, and so forth. In some embodiments, the AV 602 may not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

AV 602 can additionally include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a planning stack 616, a control stack 618, a communications stack 620, an High Definition (HD) geospatial database 622, and an AV operational database 624, among other stacks and systems.

Perception stack 612 can enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 622, other components of the AV, and other data sources (e.g., the data center 650, the client computing device 670, third-party data sources, etc.). The perception stack 612 can detect and classify objects and determine their current and predicted locations, speeds, directions, and the like. In addition, the perception stack 612 can determine the free space around the AV 602 (e.g., to maintain a safe distance from other objects, change lanes, park the AV, etc.). The perception stack 612 can also identify environmental uncertainties, such as where to look for moving objects, flag areas that may be obscured or blocked from view, and so forth.

Mapping and localization stack 614 can determine the AV's position and orientation (pose) using different methods from multiple systems (e.g., GPS, IMUs, cameras, LIDAR, RADAR, ultrasonic sensors, the HD geospatial database 622, etc.). For example, in some embodiments, the AV 602 can compare sensor data captured in real-time by the sensor systems 604-608 to data in the HD geospatial database 622 to determine its precise (e.g., accurate to the order of a few centimeters or less) position and orientation. The AV 602 can focus its search based on sensor data from one or more first sensor systems (e.g., GPS) by matching sensor data from one or more second sensor systems (e.g., LIDAR). If the mapping and localization information from one system is unavailable, the AV 602 can use mapping and localization information from a redundant system and/or from remote data sources.

The planning stack 616 can determine how to maneuver or operate the AV 602 safely and efficiently in its environment. For example, the planning stack 616 can receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 602 from one point to another. The planning stack 616 can determine multiple sets of one or more mechanical operations that the AV 602 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 616 can select from multiple backup plans to carry out. For example, while preparing to change lanes to turn right at an intersection, another vehicle may aggressively cut into the destination lane, making the lane change unsafe. The planning stack 616 could have already determined an alternative plan for such an event, and upon its occurrence, help to direct the AV 602 to go around the block instead of blocking a current lane while waiting for an opening to change lanes.

The control stack 618 can manage the operation of the vehicle propulsion system 630, the braking system 632, the steering system 634, the safety system 636, and the cabin system 638. The control stack 618 can receive sensor signals from the sensor systems 604-608 as well as communicate with other stacks or components of the local computing device 610 or a remote system (e.g., the data center 650) to effectuate operation of the AV 602. For example, the control stack 618 can implement the final path or actions from the multiple paths or actions provided by the planning stack 616. This can involve turning the routes and decisions from the planning stack 616 into commands for the actuators that control the AV's steering, throttle, brake, and drive unit.

The communication stack 620 can transmit and receive signals between the various stacks and other components of the AV 602 and between the AV 602, the data center 650, the client computing device 670, and other remote systems. The communication stack 620 can enable the local computing device 610 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 620 can also facilitate local exchange of information, such as through a wired connection (e.g., a user's mobile computing device docked in an in-car docking station or connected via Universal Serial Bus (USB)) or a local wireless connection (e.g., Wireless Local Area Network (WLAN), Bluetooth©, infrared, etc.).

The HD geospatial database 622 can store HD maps and related data of the streets upon which the AV 602 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 624 can store raw AV data generated by the sensor systems 604-608 and other components of the AV 602 and/or data received by the AV 602 from remote systems (e.g., the data center 650, the client computing device 670, etc.). In some embodiments, the raw AV data can include HD LIDAR point cloud data, image or video data, RADAR data, GPS data, and other sensor data that the data center 650 can use for creating or updating AV geospatial data as discussed further elsewhere in the present disclosure.

The data center 650 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 650 can include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like.

The data center 650 can send and receive various signals to and from the AV 602 and the client computing device 670. These signals can include sensor data captured by the sensor systems 604-608, roadside assistance requests, software updates, ridesharing pick-up and drop-off instructions, and so forth. In this example, the data center 650 includes one or more of a data management platform 652, an Artificial Intelligence/Machine Learning (AI/ML) platform 654, a simulation platform 656, a remote assistance platform 658, a ridesharing platform 660, and a map management platform 662, among other systems.

Data management platform 652 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 can access data stored by the data management platform 652 to provide their respective services.

The AI/ML platform 654 can provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists can prepare data sets from the data management platform

652; select, design, and train machine learning models; evaluate, refine, and deploy the models; maintain, monitor, and retrain the models; and so on.

The simulation platform 656 can enable testing and validation of the algorithms, machine learning models, neural networks, and other development efforts for the AV 602, the remote assistance platform 658, the ridesharing platform 660, the map management platform 662, and other platforms and systems. The simulation platform 656 can replicate a variety of driving environments and/or reproduce real-world scenarios from data captured by the AV 602, including rendering geospatial information and road infrastructure (e.g., streets, lanes, crosswalks, traffic lights, stop signs, etc.) obtained from the map management platform 662; modeling the behavior of other vehicles, bicycles, pedestrians, and other dynamic elements; simulating inclement weather conditions, different traffic scenarios; and so on.

The remote assistance platform 658 can generate and transmit instructions regarding the operation of the AV 602. For example, in response to an output of the AI/ML platform 654 or other system of the data center 650, the remote assistance platform 658 can prepare instructions for one or more stacks or other components of the AV 602.

The ridesharing platform 660 can interact with a customer of a ridesharing service via a ridesharing application 672 executing on the client computing device 670. The client computing device 670 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 672. The client computing device 670 can be a customer's mobile computing device or a computing device integrated with the AV 602 (e.g., the local computing device 610). The ridesharing platform 660 can receive requests to be picked up or dropped off from the ridesharing application 672 and dispatch the AV 602 for the trip.

Map management platform 662 can provide a set of tools for the manipulation and management of geographic and spatial (geospatial) and related attribute data. The data management platform 652 can receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes when necessary. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks.

In some embodiments, the map viewing services of map management platform 662 can be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit en route to a pick-up or drop-off location, and so on.

Example Processing System

Figure 7:
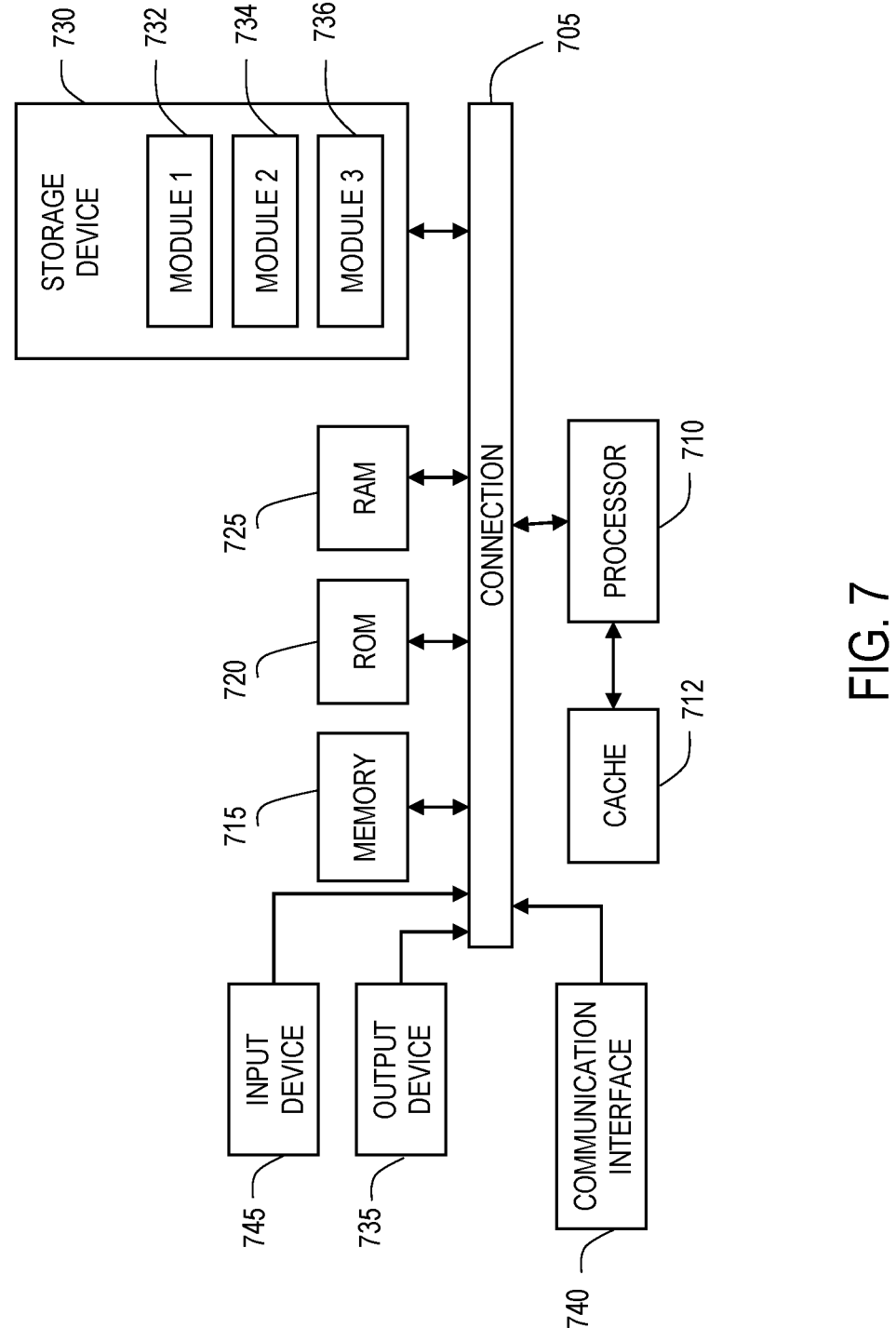
FIG. 7 illustrates an example processor-based system with which some aspects of the subject technology can be implemented.

FIG. 7 illustrates an example processor-based system with which some aspects of the subject technology can be implemented. For example, processor-based system 700 can be any computing device making up, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection. In various examples, an active tunable filter as discussed herein can be added to any of the components to filter harmonics and/or noise from transmitted signals.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (Central Processing Unit (CPU) or processor) 710 and connection 705 that couples various system components including system memory 715, such as Read-Only Memory (ROM) 720 and Random-Access Memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 730 can include software services, servers, services, etc., that when the code that defines such software is executed by the processor 710, it causes the system 700 to perform a function. In some embodiments, a hardware service that performs a particular function can include the software component stored in a computer-readable medium in connection with the necessary hardware components, such as processor 710, connection 705, output device 735, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Example 1 provides a system for multi-camera image processing in a vehicle, including a camera attention module to receive a first set of images from a first camera, a second set of images from a second camera, and a first driving maneuver from an onboard computer; a first imaging module configured to process the first set of images and generate a first feature matrix, where the first feature matrix has high accuracy feature detection; a second imaging module configured to: process the second set of images, decrease an image data size of the second set of images, and generate a second feature matrix, where the second feature matrix has lower accuracy feature detection than the first feature matrix; an extracted feature module to combine the first feature matrix and the second feature matrix and generate 2D multi-view features; an encoder configured to receive the 2D multi-view features and determine a 3D position for each respective 2D multi-view feature; and an output module to output a set of detected objects from the first and second sets of images based on the 2D multi-view features and the 3D position; where the camera attention module is configured to determine, in response to receiving the first driving maneuver, to input the first set of images to the first imaging module and to input the second set of images to the second imaging module.

Example 2 provides the system of example 1, where the first imaging module and the second imaging module are neural networks configured to perform feature detection.

Example 3 provides the system of example 2, where the second imaging module has fewer neural network layers than the first imaging module.

Example 4 provides the system of example 1, where the second imaging module is configured to decrease the image data size of the second set of images by removing selected images from the second set of images.

Example 5 provides the system of example 4, where the second set of images includes consecutively captured images, and the second imaging module is configured to decrease the image data size of the second set of images by removing every second consecutive image.

Example 6 provides the system of example 1, where the second imaging module is configured to decrease the image data size of the second set of images by decreasing a resolution of respective images of the second set of images.

Example 7 provides the system of example 1, where the output module is further configured to output a set of birds eye view images based on the first and second sets of images, the 2D multi-view features, and the 3D position.

Example 8 provides the system of example 1, where the encoder is further configured to transform the 2D multi-view features using a convolution layer to generate transformed features and add 3D position data to the transformed features to generate 3D features.

Example 9 provides the system of example 8, further including a decoder to flatten the 3D features.

Example 10 provides a method for multi-camera image processing, including receiving a set of images from a plurality of cameras, where the set of images includes a first subset of images from a first camera and a second subset of images from a second camera; receiving a next planned vehicle maneuver; determining, based on the next planned vehicle maneuver, that the first subset of images is to be input to a first backbone model; generating, at the first backbone model, a first feature matrix having high accuracy feature detection; determining, based on the next planned vehicle maneuver, that the second subset of images is to be input to a second backbone model; decreasing an image data size of the second subset of images to generate a reduced second subset of images; generating, at the second backbone model, using the reduced second subset of images, a second feature matrix having low accuracy long range feature detection; combining the first feature matrix and the second feature matrix to generate 2D multi-view features; determining a 3D position for each respective 2D multi-view feature; and outputting a set of detected objects from the first and second subsets of images based on the 2D multi-view features and a corresponding 3D position.

Example 11 provides the method of example 10, where receiving the next planned vehicle maneuver includes receiving a driving maneuver planned for vehicle execution in less than ten seconds.

Example 12 provides the method of example 10, where the first backbone model is a first neural network, where the second backbone model is a second neural network, and where generating the first feature matrix includes performing feature detection, by the first neural network, on the first subset of images, and where generating the second feature matrix includes performing feature detection, by the second neural network, on the reduced second subset of images.

Example 13 provides the method of example 10, where decreasing the image data size of the second subset of images includes removing selected images from the second subset of images.

Example 14 provides the method of example 13, where the second subset of images includes consecutively captured images, and where decreasing the image data size of the second subset of images includes removing every second consecutive image.

Example 15 provides the method of example 10, where decreasing the image data size of the second subset of images includes decreasing a resolution of respective images of the second subset of images.

Example 16 provides the method of example 10, further including outputting a set of birds eye view images, where each birds eye view image of the set of birds eye view images is generated from the first subset of images and the reduced second subset of images, the 2D multi-view features, and the 3D position.

Example 17 provides the method of example 10, further including transforming the 2D multi-view features using a convolution layer, generating transformed features, and adding 3D position data to the transformed features to generate 3D features.

Example 18 provides the method of example 17, further including flattening the 3D features.

Example 19 provides one or more non-transitory computer-readable media storing instructions executable to perform operations, the operations including receiving a set of images from a plurality of cameras, where the set of images includes a first subset of images from a first camera and a second subset of images from a second camera; receiving a next planned vehicle maneuver; determining, based on the next planned vehicle maneuver, that the first subset of images is to be input to a first backbone model; generating, at the first backbone model, a first feature matrix having high accuracy feature detection; determining, based on the next planned vehicle maneuver, that the second subset of images is to be input to a second backbone model; decreasing an image data size of the second subset of images to generate a reduced second subset of images; generating, at the second backbone model, using the reduced second subset of images, a second feature matrix having low accuracy long range feature detection; combining the first feature matrix and the second feature matrix to generate 2D multi-view features; determining a 3D position for each respective 2D multi-view feature; and outputting a set of detected objects from the first subset of images and the reduced second subset of images based on the 2D multi-view features and a corresponding 3D position.

Example 20 provides the one or more non-transitory computer-readable media of example 19, where the first backbone model is a first neural network, where the second backbone model is a second neural network, and where generating the first feature matrix includes performing feature detection, by the first neural network, on the first subset of images, and where generating the second feature matrix includes performing feature detection, by the second neural network, on the reduced second subset of images.

The various embodiments described above are provided byway of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A system for multi-camera image processing in a vehicle, comprising:
   a camera attention module to receive a first set of images from a first camera, a second set of images from a second camera, and a first driving maneuver from an onboard computer;
   a first imaging module configured to process the first set of images and generate a first feature matrix, wherein the first feature matrix has high accuracy feature detection;
   a second imaging module configured to:
      process the second set of images,
      decrease an image data size of the second set of images, and
      generate a second feature matrix, wherein the second feature matrix has lower accuracy feature detection than the first feature matrix;
   an extracted feature module to combine the first feature matrix and the second feature matrix and generate two-dimensional (2D) multi-view features;
   an encoder configured to receive the 2D multi-view features and determine a three-dimensional (3D) position for each respective 2D multi-view feature; and
   an output module to output a set of detected objects from the first and second sets of images based on the 2D multi-view features and the 3D position;
   wherein the camera attention module is configured to determine, in response to receiving the first driving maneuver, to input the first set of images to the first imaging module and to input the second set of images to the second imaging module.

2. The system of claim 1, wherein the first imaging module and the second imaging module are neural networks configured to perform feature detection.

3. The system of claim 2, wherein the second imaging module has fewer neural network layers than the first imaging module.

4. The system of claim 1, wherein the second imaging module is configured to decrease the image data size of the second set of images by removing selected images from the second set of images.

5. The system of claim 4, wherein the second set of images includes consecutively captured images, and the second imaging module is configured to decrease the image data size of the second set of images by removing every second consecutive image.

6. The system of claim 1, wherein the second imaging module is configured to decrease the image data size of the second set of images by decreasing a resolution of respective images of the second set of images.

7. The system of claim 1, wherein the output module is further configured to output a set of birds eye view images based on the first and second sets of images, the 2D multi-view features, and the 3D position.

8. The system of claim 1, wherein the encoder is further configured to transform the 2D multi-view features using a convolution layer to generate transformed features and add 3D position data to the transformed features to generate 3D features.

9. The system of claim 8, further comprising a decoder to flatten the 3D features.

10. A method for multi-camera image processing, comprising:

receiving a set of images from a plurality of cameras, wherein the set of images includes a first subset of images from a first camera and a second subset of images from a second camera;

receiving a next planned vehicle maneuver;

determining, based on the next planned vehicle maneuver, that the first subset of images is to be input to a first backbone model;

generating, at the first backbone model, a first feature matrix having high accuracy feature detection;

determining, based on the next planned vehicle maneuver, that the second subset of images is to be input to a second backbone model;

decreasing an image data size of the second subset of images to generate a reduced second subset of images;

generating, at the second backbone model, using the reduced second subset of images, a second feature matrix having low accuracy long range feature detection;

combining the first feature matrix and the second feature matrix to generate two-dimensional (2D) multi-view features;

determining a three-dimensional (3D) position for each respective 2D multi-view feature; and outputting a set of detected objects from the first and second subsets of images based on the 2D multi-view features and a corresponding 3D position.

11. The method of claim 10, wherein receiving the next planned vehicle maneuver includes receiving a driving maneuver planned for vehicle execution in less than ten seconds.

12. The method of claim 10, wherein the first backbone model is a first neural network, wherein the second backbone model is a second neural network, and wherein generating the first feature matrix includes performing feature detection, by the first neural network, on the first subset of images, and wherein generating the second feature matrix includes performing feature detection, by the second neural network, on the reduced second subset of images.

13. The method of claim 10, wherein decreasing the image data size of the second subset of images includes removing selected images from the second subset of images.

14. The method of claim 13, wherein the second subset of images includes consecutively captured images, and wherein decreasing the image data size of the second subset of images includes removing every second consecutive image.

15. The method of claim 10, wherein decreasing the image data size of the second subset of images includes decreasing a resolution of respective images of the second subset of images.

16. The method of claim 10, further comprising outputting a set of birds eye view images, wherein each birds eye view image of the set of birds eye view images is generated from the first subset of images and the reduced second subset of images, the 2D multi-view features, and the 3D position.

17. The method of claim 10, further comprising transforming the 2D multi-view features using a convolution layer, generating transformed features, and adding 3D position data to the transformed features to generate 3D features.

18. The method of claim 17, further comprising flattening the 3D features.

19. One or more non-transitory computer-readable media storing instructions executable to perform operations, the operations comprising:

receiving a set of images from a plurality of cameras, wherein the set of images includes a first subset of images from a first camera and a second subset of images from a second camera;

receiving a next planned vehicle maneuver;

determining, based on the next planned vehicle maneuver, that the first subset of images is to be input to a first backbone model;

generating, at the first backbone model, a first feature matrix having high accuracy feature detection;

determining, based on the next planned vehicle maneuver, that the second subset of images is to be input to a second backbone model;

decreasing an image data size of the second subset of images to generate a reduced second subset of images;

generating, at the second backbone model, using the reduced second subset of images, a second feature matrix having low accuracy long range feature detection;

combining the first feature matrix and the second feature matrix to generate two-dimensional (2D) multi-view features;

determining a three-dimensional (3D) position for each respective 2D multi-view feature; and outputting a set of detected objects from the first subset of images and the reduced second subset of images based on the 2D multi-view features and a corresponding 3D position.

20. The one or more non-transitory computer-readable media of claim 19, wherein the first backbone model is a first neural network, wherein the second backbone model is a second neural network, and wherein generating the first feature matrix includes performing feature detection, by the first neural network, on the first subset of images, and wherein generating the second feature matrix includes performing feature detection, by the second neural network, on the reduced second subset of images.

* * * * *